Nov. 15, 1966 J. R. STOLPMANN 3,285,631
INDIUM COATED O-RING SEAL
Filed June 5, 1963
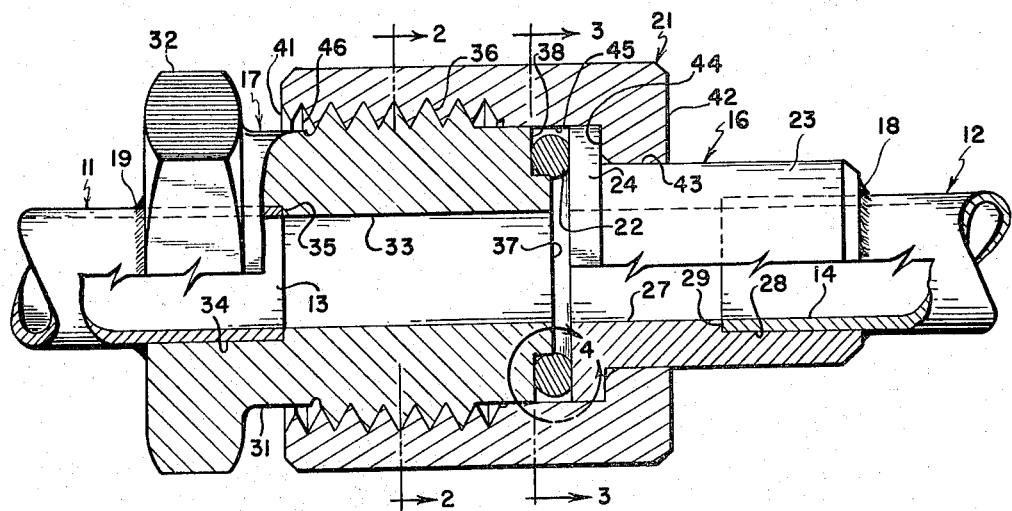
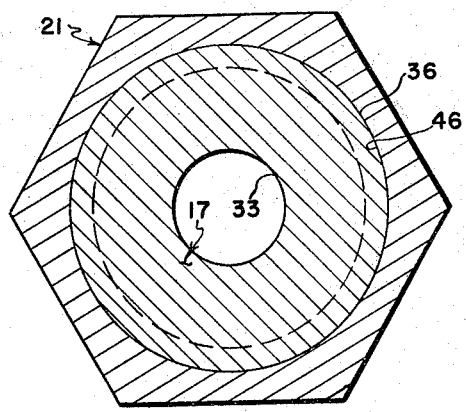
Fig. 2
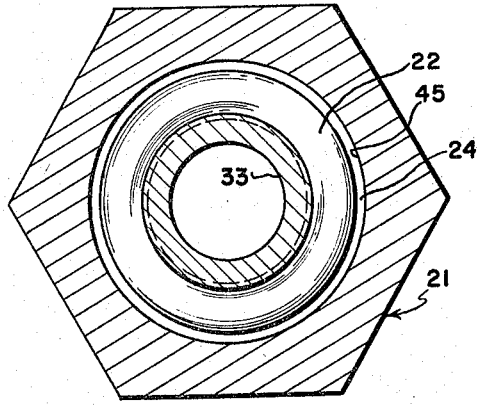
Fig. 3
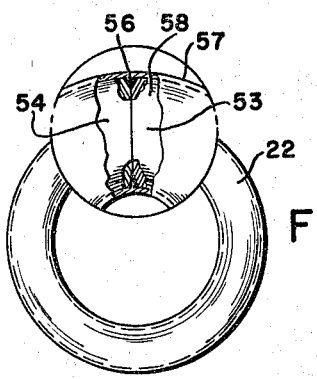
Fig. 5
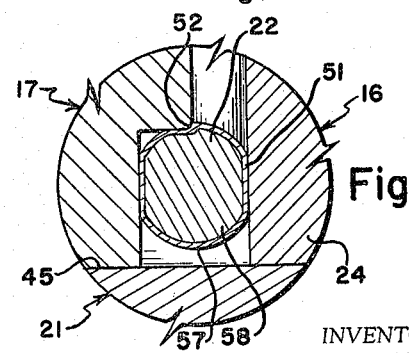
Fig. 4
INVENTOR.
JAMES R. STOLPMANN

United States Patent Office 3,285,631
Patented Nov. 15, 1966

3,285,631
INDIUM COATED O-RING SEAL
James R. Stolpmann, 1853 West Ave., Miami Beach, Fla.
Filed June 5, 1963, Ser. No. 285,825
3 Claims. (Cl. 285—354)

This invention relates to an indium coated O-ring seal for use in cryogenic tubing connectors, and, more particularly, this invention relates to a novel cryogenic tubing connector including an indium coated O-ring seal of the type described more fully hereinafter for use in forming a seal between confronting pieces of cryogenic tubing.

As is perhaps well known, it is often desirable to have a leak-proof joint for joining together pieces of tubing; for instance, in building and testing component systems for a liquid hydrogen bubble chamber it is necessary to have a connector which is adapted to be readily assembled and disassembled but which, when assembled, is tight through a range of temperatures extending from that of room temperature to minus 320° F.

In the past, there have been developed various types of connectors which include a first member attached to the end of one piece of tubing and a second member attached to the end of another piece of tubing, the members being adapted to be brought into tight abutting relation with each other by a third member, the connector including an O-ring disposed between the first and second member which is adapted to be deformed caused by the forces brought to bear thereon of the third member; however, such connectors have been generally unreliable for maximum range of temperature and pressures in that leaks are quite common.

This invention relates generally to such a connector as that set forth above and includes an improved structure for the connector and O-ring, the O-ring being of copper and coated with indium, whereby when the first and second member are drawn together the O-ring is deformed and prohibits passage of fluid thereby.

It is, accordingly, an object of this invention to provide a structure for a leak-proof tubing connector which may be readily disassembled and which is relatively leak-proof through a wide range of temperatures and pressures.

It is another object of this invention to provide an O-ring for use in cryogenic tubing connectors which is coated with indium.

It is also an object of this invention to provide a method or process for making indium coated O-rings for use in cryogenic tubing connectors.

It is a general object of this invention to provide a cryogenic tubing connector which is relatively leak-proof, may be readily assembled or disassembled, which is relatively inexpensive to manufacture and is otherwise well adapted for the purposes for which it is intended.

In accordance with these and other objects which will become apparent hereinafter, the instant invention will now be described with reference to the accompanying drawings illustrating a preferred embodiment thereof.

In the drawings:

FIG. 1 is a side elevation view of a cryogenic tubing connector, partly in cross-section and attached to confronting pieces of tubing;

FIG 2 is a cross-sectional view taken along the line 2—2 of FIG. 1 and looking in the direction of the arrows.

FIG. 3 is a cross-sectional view taken along the line 3—3 of FIG. 2 and looking in the direction of the arrows;

FIG. 4 is an enlarged view in cross section of the area designated by the numeral 4 in FIG. 1; and FIG. 5 is a plan view of an indium coated O-ring, partly enlarged illustrating the details of the said ring.

Referring more particularly to the drawings, wherein like reference characters designate like or corresponding parts throughout the different views, and referring particularly to FIG. 1, the numerals 11 and 12 designate two confronting ends of tubing which are joined together, the end portions of the respective confronting pieces of tubing being designated by their numerals 13 and 14. To each end portion a nut member is fastened 16 and 17 by silver solder or other suitable means as at 18 and 19. A third nut member 21 is provided, said third nut member being adapted to draw the first and second nut members together in tight abutting engagement so as to deform an indium coated O-ring 22 disposed therebetween, as is explained more fully hereinafter.

Referring to FIG. 1, the first nut member 16, on the right-hand side of the figure, is generally cylindrical in shape along a main body portion 23 and includes a radially extending flange portion 24 at the distal end thereof. The first nut member 16 is provided with a central axial bore therethrough which is counter-bored at one end thereof whereby there is formed a first chamber 27 and a second larger chamber 28 with a shoulder 29 therebetween. The end portion 14 of the piece of tubing 12 is receivable in the second chamber with the end face thereof abutting the shoulder 29. It is noted that the interior walls of the second chamber are complementally shaped to that of the exterior periphery of the end 14 of the piece of tubing 12.

With further reference to FIG. 1, the second nut member 17, on the left in FIG. 1, also is generally cylindrical in shape along a main body portion 31 and includes a radially extending flange 32 on the connected end thereof, as opposed to the distal end. The second nut member 17 is provided with a central axial bore therethrough which is counter-bored at one end thereof forming a first chamber 33 and a second larger chamber 34 with a shoulder 35 therebetween. The end portion 13 is receivable in the second chamber with the end face thereof being in abutting engagement with the shoulder 35. It is noted also that the walls of the second chamber are complementally shaped to that of the exterior periphery of the end 13 of the piece of tubing 11. The exterior periphery of the flange portion 32 is hexagonal in shape whereby it is adapted to be held or manipulated by a tool and the exterior periphery of the main body portion 31 is threaded along its length, as at 36. In the end face 37 of the second nut member 17 there is provided an annular peripheral recess 38 forming a seat for a purpose to be described.

The third nut member 21 is cup-shaped having an open top end 41 and a bottom end 42, said bottom end having a central bore 43 therethrough sized to slidably receive the main body portion 23 of the first member 16 therein with the main periphery of the body portion in abutting engagement along its axial length with the walls of the bore 43, and with the interior bottom surface 44 of the nut-shaped member being in abutting engagement with the radially extending flange portion 24 of the first nut member and the interior wall 45 of the third nut member being in abutting engagement with the peripheral area of the flange portion 24 of the first nut member. The interior wall 45 of the third nut member is threaded along its length as at 46, the threads being complementary to the exterior threads 36 of the second nut member.

The O-ring 22 is normally disposed in the seat defined by the annular recess 38 and in abutting engagement with the confronting end faces.

In assembly, the first and second nut members 16 and 17 are fastened to the end portions of the two confronting pieces of tubing as is shown in FIG. 1 by silver solder or the like, and the third nut member 21 is threaded over the second nut member causing the bottom of the third nut member to draw the face flange portion 24 of the first nut member into tight abutting relation with the end face of the first nut member. The indium coated O-ring in the annular recess 38 is deformed, by the forces brought to bear in this manner, as is indicated in FIG. 4, the periphery thereof being flattened along one, two or three sides as at 51 with the relatively sharp corner 52 biting into the O-ring at a point on its exterior.

It has been found that a suitable O-ring may be fabricated from a length of soft copper wire which has been annealed and wound around a cylinder of a suitable diameter and the windings cut along an axial line with a fine saw. The ends 53 and 54 of each copper ring thus formed is silver soldered as at 56 and filed down around the perimeter of the junction to achieve a generally uniform diameter. A ring thus prepared is dipped into a soft soldering flux and then immersed in a container of molten indium forming a coating 57 on the copper base 58. It has been found that the indium coating thus formed is of the magnitude with respect to thickness of .0005 inch. It has further been found that a ring thus coated may be removed from the induim bath with a wire having a loop adapted to fit into the inside diameter of the ring. After removal from the molten indium the excess indium is trimmed with a sharp knife to render the ring of substantially uniform diameter. It appears that the O-ring may also be fabricated by spraying or plating methods.

The configuration of the connector described permits the tubes to be fastened together and taken apart simply by threadably releasing the third nut member, which can be manipulated with respect to the second nut member by conventional tools.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A leak-proof connector assembly for joining confronting ends of two pieces of tubing comprising:
   a first nut member having a longitudinal bore therethrough and a counter-bore forming a first chamber in one end thereof and a second larger chamber in the other end thereof with an interiorally disposed shoulder formed between said chambers, said first member being adapted to be mounted to an end of a first piece of tubing, the interior peripheral area of the second chamber of said nut member being shaped for receiving the exterior peripheral wall of said first piece of tubing with the end thereof therein with the end face of the tubing being in abutting engagement with the shoulder, said first nut member having an exteriorally disposed and radially extending terminal flange having a flat, radial, annular sealing surface at the one end thereof and an annular shoulder rearwardly of said sealing surface;
   a second nut member having a longitudinal bore therethrough and a counter-bore forming a first chamber in one end thereof and a second larger chamber in the other end thereof with an interiorally disposed shoulder formed between said chambers, said second nut member being adapted to be mounted to an end of the other piece of tubing, the interior peripheral area of the second chamber being shaped for receiving the wall of the end of the other piece of tubing the end thereof therein with the end face being in abutting engagement with the shoulder, said second nut member having a flange adjacent its other end, the periphery of the flange having a surface for being grasped by a tool and the exterior periphery of the main body of the second member being exteriorally threaded there-along and the said one end thereof having an annular peripheral recess in the end face and forming an axially projecting seat portion, said annular peripheral recess forming a rear, radial, flat sealing surface normal to said axially projecting seat portion, said axially projecting seat portion having a uniform cross section and a peripheral sealing edge at the terminal edge of said seat portion;
   an indium coated O-ring disposed on said seat and projecting beyond said peripheral sealing edge and adapted to normally abut the flange of said first member, said O-ring including an inner core relatively harder than the outer indium coating of said O-ring and said coating comprising a relatively deformable surface for flowing when subjected to sealing pressures; and
   a third cup-shaped nut member having an open end and an opposite end with a central bore therethrough slideably receiving said first nut member therein, the interior wall of said cup-shaped member being complementally threaded with respect to the exteriorally disposed threads of said second member, the exterior walls of said third member being adapted for manipulation by a tool, the interior surface of said opposite end being shaped for abutting the exteriorally disposed flange of said first nut member when the first nut member is drawn toward abutting and confronting engagement with said second member with the O-ring disposed therebetween, said first member flange and second member radial sealing surfaces having relatively broad, opposed annular surface portions clampingly engaging opposed annular surfaces of said O-ring therebetween and said seat portion sealing edge engaging said O-ring inwardly of said relatively broad opposed sealing surfaces when said O-ring is deformed annularly inwardly;
   whereby said first nut member, said second nut member, said indium-coated O-ring and said third nut member comprise a unitary device for joining confronting ends of two pieces of tubing when said flange and said opposite end of the third nut member co-operate upon threading of said third nut member to said second nut member to draw the two said one ends tightly against said indium-coated O-ring deforming it and forming a pressure-tight seal therebetween effective at both normal and cryogenic pressures and temperatures.

2. The structure as claimed in claim 1 wherein said indium coated O-ring inner core comprises a copper ring having an adherent coating of indium, the thickness of said coating being adapted to provide a substantially smooth and deformable bearing surface.

3. The structure as claimed in claim 2 wherein the thickness of the indium coating of said O-ring is substantially .0005 inch.

(References on following page)

References Cited by the Examiner

UNITED STATES PATENTS

| | | | |
|---|---|---|---|
| 392,931 | 11/1888 | Prindle | 285—354 X |
| 1,960,740 | 5/1934 | Gray et al. | |
| 2,036,596 | 4/1936 | McMahon | 285—353 |
| 2,162,184 | 6/1939 | Snyder | 285—353 |
| 2,305,668 | 12/1942 | Bruno | 285—354 X |
| 2,417,967 | 3/1947 | Bool. | |
| 2,611,506 | 9/1952 | Scheer. | |
| 2,932,084 | 4/1960 | Deis | 29—460 |
| 3,038,731 | 6/1962 | Milleron | 277—135 X |
| 3,073,019 | 1/1963 | Caplan et al. | 29—460 |
| 3,167,320 | 1/1965 | Kyle | 277—236 X |

FOREIGN PATENTS

| | | |
|---|---|---|
| 1,321,598 | 2/1963 | France. |
| 440,727 | 2/1927 | Germany. |
| 820,113 | 9/1959 | Great Britain. |
| 863,390 | 3/1961 | Great Britain. |

CARL W. TOMLIN, *Primary Examiner.*

THEMAS F. CALLAGHAN, *Examiner.*

R. E. SCOTT, *Assistant Examiner.*